United States Patent
Kurokawa et al.

(10) Patent No.: US 11,761,582 B2
(45) Date of Patent: Sep. 19, 2023

(54) PRESSURE REGULATION SYSTEM AND METHOD FOR A FLUIDIC PRODUCT HAVING PARTICLES

(71) Applicant: DHF AMERICA, LLC, Raleigh, NC (US)

(72) Inventors: Yuji Kurokawa, Tokyo (JP); Toshiya Matsumoto, Tokyo (JP); Kenji Yatabe, Tokyo (JP); Isamu Umeda, Tokyo (JP)

(73) Assignee: DHF AMERICA, LLC, Raleigh, NC (US)

( * ) Notice: Subject to any disclaimer, the term of this patent is extended or adjusted under 35 U.S.C. 154(b) by 390 days.

(21) Appl. No.: 17/006,008

(22) Filed: Aug. 28, 2020

(65) Prior Publication Data

US 2021/0071813 A1 Mar. 11, 2021

Related U.S. Application Data

(60) Provisional application No. 62/896,151, filed on Sep. 5, 2019.

(51) Int. Cl.
*G05D 11/13* (2006.01)
*F16T 1/14* (2006.01)
(Continued)

(52) U.S. Cl.
CPC ............... *F16T 1/14* (2013.01); *F04B 39/16* (2013.01); *F04B 41/02* (2013.01); *F16T 1/383* (2013.01);
(Continued)

(58) Field of Classification Search
CPC .. G05D 9/00–12; G05D 16/04; G05D 7/0652; G05D 7/0658; G05D 7/0664;
(Continued)

(56) References Cited

U.S. PATENT DOCUMENTS 3,035,888 A * 5/1962 Massey .................... B01J 4/008
422/129
3,486,297 A * 12/1969 Eisinga .................. E21B 43/00
96/155
(Continued)

FOREIGN PATENT DOCUMENTS

EP 1507979 B1 1/2009
JP 4843125 B2 12/2011
WO 2008/120662 A1 10/2008

*Primary Examiner* — Craig J Price
(74) *Attorney, Agent, or Firm* — Greer, Burns & Crain, Ltd (57) ABSTRACT

A method of maintaining a backpressure of a fluidic product is provided. The method includes pressurizing a first reservoir to a first predetermined pressure level using compressed air, delivering the fluidic product to the pressurized first reservoir until a current level of the fluidic product in the first reservoir reaches a first predetermined level, pressurizing a second reservoir to a second predetermined pressure level using the compressed air, delivering the fluidic product to the pressurized second reservoir until a current level of the fluidic product in the second reservoir reaches a second predetermined level, and controlling the backpressure of the fluidic product using the first reservoir and the second reservoir such that a discharge flow of the fluidic product is continuous.

17 Claims, 4 Drawing Sheets

(51) Int. Cl.
  *F04B 39/16* (2006.01)
  *F16T 1/38* (2006.01)
  *G05D 9/04* (2006.01)
  *F04B 41/02* (2006.01)
  *G05D 16/00* (2006.01)

(52) U.S. Cl.
  CPC ............. *G05D 9/04* (2013.01); *G05D 16/024* (2019.01); *B01J 2219/00049* (2013.01); *B01J 2219/00162* (2013.01); *B60G 2500/204* (2013.01); *G05D 11/131* (2013.01); *Y10T 137/3127* (2015.04)

(58) Field of Classification Search
  CPC .. G05D 11/131; G05D 11/006; B67D 7/0238; B67D 7/0266; Y10T 137/27; Y10T 137/2569; Y10T 137/3115; Y10T 137/3124; Y10T 137/3127; Y10T 137/0396; Y10T 137/3143; Y10T 137/3146; B01J 2219/00049; B01J 2219/00162; F04B 41/02
  USPC .......... 137/14, 87.02, 109–113, 115.02, 183, 137/184, 189, 191, 187, 403, 408, 208, 137/209, 206, 213, 214
  See application file for complete search history.

(56) References Cited

U.S. PATENT DOCUMENTS

| | | | | |
|---|---|---|---|---|
| 4,580,699 A * | 4/1986 | Black | ................... | B01F 35/88 222/64 |
| 5,148,945 A * | 9/1992 | Geatz | ................ | H01L 21/67276 222/61 |
| 5,261,440 A * | 11/1993 | Frank | ..................... | B64D 11/02 137/208 |
| 5,330,072 A * | 7/1994 | Ferri, Jr. | ................. | G01F 11/28 222/61 |
| 5,383,574 A * | 1/1995 | Raphael | ............... | B67D 7/0283 222/64 |
| 5,417,346 A * | 5/1995 | Ferri, Jr. | ........... | H01L 21/67276 222/61 |
| 5,632,960 A * | 5/1997 | Ferri, Jr. | ............... | G05D 11/133 422/111 |
| 5,653,533 A * | 8/1997 | Green | ................... | B28C 7/0418 366/182.1 |
| 6,019,250 A * | 2/2000 | Pozniak | ................. | B24B 57/02 222/1 |
| 6,098,843 A * | 8/2000 | Soberanis | ............ | B67D 7/0238 222/53 |
| 6,269,975 B2 * | 8/2001 | Soberanis | ............ | B01F 35/881 222/1 |
| 6,554,162 B2 * | 4/2003 | Schell | ................... | B01F 35/882 222/64 |
| 6,623,248 B1 * | 9/2003 | Dusemund | .............. | F04B 9/129 137/255 |
| 6,736,154 B2 * | 5/2004 | Xu | .......................... | B24B 57/02 222/399 |
| 6,874,929 B2 * | 4/2005 | Hiraoka | .................. | B01F 33/80 137/391 |
| 6,881,267 B2 * | 4/2005 | Kim | .................... | H01L 21/6715 118/712 |
| 7,001,466 B2 * | 2/2006 | Hong | ...................... | C03C 25/18 222/64 |
| 7,044,152 B2 * | 5/2006 | Scalzi | ....................... | B09C 1/08 137/208 |
| 7,100,631 B2 * | 9/2006 | Liu | ....................... | G05D 11/132 137/208 |
| 7,129,388 B2 * | 10/2006 | Scalzi | ....................... | B09C 1/08 588/316 |
| 7,531,709 B2 * | 5/2009 | Scalzi | ....................... | B09C 1/08 |
| 7,810,516 B2 * | 10/2010 | Gerken | ..................... | F04F 1/02 137/87.02 |
| 8,801,859 B2 | 8/2014 | Simard et al. | | |
| 8,840,995 B2 | 9/2014 | Kadam et al. | | |
| 9,139,890 B2 * | 9/2015 | Mitsui | ................. | C22B 23/0469 |
| 9,963,555 B2 | 5/2018 | Kilambi et al. | | |
| 10,053,745 B2 | 8/2018 | Kilambi et al. | | |
| 11,454,351 B2 * | 9/2022 | Guan | ....................... | F17D 1/005 |

* cited by examiner

PRESSURE REGULATION SYSTEM AND METHOD FOR A FLUIDIC PRODUCT HAVING PARTICLES

CROSS-REFERENCE TO RELATED APPLICATIONS

The present application claims priority to U.S. Provisional Application No. 62/896,151, filed Sep. 5, 2019, titled "PRESSURE REGULATION SYSTEM AND METHOD FOR A FLUIDIC PRODUCT HAVING PARTICLES," which is incorporated by reference herein in its entirety.

BACKGROUND

The present invention relates to a system for controlling a pressure of a fluidic product, and more specifically relates to a pressure regulation system for reaction treatment of the fluidic product having particles at elevated temperature and pressure.

Using a decomposing reactor, the fluidic product, such as an aqueous solution having particles, is decomposed into a treated product through one or more chemical reactions. In certain cases, the particles of the aqueous solution include biological materials, such as fiber (e.g., cotton) particles, or in some cases, include organic materials, such as plastic particles.

During operation, the aqueous solution is stirred and heated in the decomposing reactor at high temperature and pressure for inducing the chemical reactions for the biological materials and/or the organic materials in the aqueous solution. The decomposing reactor produces the treated product through the chemical reactions of the biological materials and/or the organic materials in the aqueous solution.

At the end of the reaction treatment of the aqueous solution, the treated product can be discharged into the atmosphere for further processing. However, due to the high pressure accumulated in the decomposing reactor, the treated product is controllably discharged using a backpressure regulator. The backpressure regulator is typically installed at a distal end of a piping system connected to the decomposing reactor. For controlling a discharge flow of the treated product, the backpressure regulator creates an obstruction to the discharge flow to maintain the backpressure of the treated product when the treated product discharged from the piping system.

As such, although existing backpressure regulators provide certain flow control for the treated product, one disadvantage of the existing backpressure regulators is that the discharge flow of the treated product is frequently interrupted because the backpressure of the treated product is only intermittently or periodically controlled.

In one example, a pressure relief valve can be used to control one or more inadvertent pressure occurrences only, not for steady state flow control. When the backpressure exceeds a predetermined value, the pressure relief valve opens to relieve an excess pressure. Thus, the discharge flow of the treated product is noncontinuous and recurrently disrupted.

In another example, a pressure regulator having a setpoint pressure spring and a diaphragm can be used to control the backpressure of the treated product. However, one disadvantage of such pressure regulators is a clogging problem when the treated product includes particles, such as the fiber particles or the plastic particles. Existing configurations of such pressure regulators are prone to clogging during operation due to the particles. Correcting the clogging frequently can be time consuming and also can cause increased operational expenses.

Thus, there is a need to develop an enhanced pressure regulation system for the fluidic product having particles that overcomes one or more above-described disadvantages of the existing backpressure regulators.

SUMMARY

In one embodiment of the present disclosure, a method of maintaining a backpressure of a fluidic product is provided. The method includes pressurizing a first reservoir to a first predetermined pressure level using compressed air, delivering the fluidic product to the pressurized first reservoir until a current level of the fluidic product in the first reservoir reaches a first predetermined level, pressurizing a second reservoir to a second predetermined pressure level using the compressed air, delivering the fluidic product to the pressurized second reservoir until a current level of the fluidic product in the second reservoir reaches a second predetermined level, and controlling the backpressure of the fluidic product using the first reservoir and the second reservoir such that a discharge flow of the fluidic product is continuous.

In one example, the method further includes continuously delivering the fluidic product to the second reservoir when an intake of the fluidic product into the first reservoir is discontinued. In one variation, the method further includes transitioning the first reservoir into an unpressurized state after discontinuing the intake of the fluidic product into the first reservoir. In another variation, the method further includes equalizing the first reservoir with atmospheric pressure to achieve the unpressurized state in the first reservoir. In yet another variation, the method further includes discharging the fluidic product from the first reservoir after transitioning the first reservoir into the unpressurized state. In still another variation, the method further includes discontinuing the discharging of the fluidic product from the first reservoir when the first reservoir is empty. In yet still another variation, the method further includes transitioning the first reservoir into a pressurized state after discontinuing the discharging of the fluidic product from the first reservoir.

In another example, the method further includes continuously delivering the fluidic product to the first reservoir when an intake of the fluidic product into the second reservoir is discontinued. In one variation, the method further includes transitioning the second reservoir into an unpressurized state after discontinuing the intake of the fluidic product into the second reservoir. In another variation, the method further includes equalizing the second reservoir with atmospheric pressure to achieve the unpressurized state in the second reservoir. In yet another variation, the method further includes discharging the fluidic product from the second reservoir after transitioning the second reservoir into the unpressurized state. In still another variation, the method further includes discontinuing the discharging of the fluidic product from the second reservoir when the second reservoir is empty. In yet still another variation, the method further includes transitioning the second reservoir into a pressurized state after discontinuing the discharging of the fluidic product from the second reservoir.

In another embodiment of the present disclosure, a system of maintaining a backpressure of a fluidic product is provided. The system includes an air supply assembly configured to pressurize a first reservoir to a first predetermined pressure level using compressed air, and pressurize a second reservoir to a second predetermined pressure level using the compressed air. Included in the system is a pump configured to deliver the fluidic product to the pressurized first reservoir until a current level of the fluidic product in the first reservoir reaches a first predetermined level, and to deliver the fluidic product to the pressurized second reservoir until a current level of the fluidic product in the second reservoir reaches a second predetermined level. Also included in the system is a controller is configured to control the backpressure of the fluidic product using the first reservoir and the second reservoir such that a discharge flow of the fluidic product is continuous.

In one example, the system further includes a backpressure regulator assembly being controllable by the controller. The backpressure regulator has an inlet, a first outlet, and a second outlet. The inlet is configured to receive the fluidic product and fluidically connected to both the first reservoir and the second reservoir. In one variation, the first outlet is fluidically connected to the first reservoir and the second outlet is fluidically connected to the second reservoir. In another variation, a first end of the first reservoir is fluidically connected to the inlet of the backpressure regulator assembly and an opposite second end of the first reservoir is fluidically connected to the air supply assembly, and a first end of the second reservoir is fluidically connected to the inlet of the backpressure regulator assembly and an opposite second end of the second reservoir is fluidically connected to the air supply assembly. In yet another variation, a first slurry supply valve is connected at one end to the inlet of the backpressure regulator assembly and at the other end to the first end of the first reservoir, and a second slurry supply valve is connected at one end to the inlet of the backpressure regulator assembly and at the other end to the first end of the second reservoir. In still another variation, a first slurry discharge valve is connected to the first end of the first reservoir, and a second slurry discharge valve is connected to the first end of the second reservoir. In yet still another variation, the controller is configured to automatically control opening and closing operations of at least one of: the air supply assembly, the first slurry supply valve, the second slurry supply valve, the first slurry discharge valve, and the second slurry discharge valve.

The methods, systems, and apparatuses disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Embodiments of the present disclosure will be described in detail herebelow with reference to the attached drawings.

Figure 1:
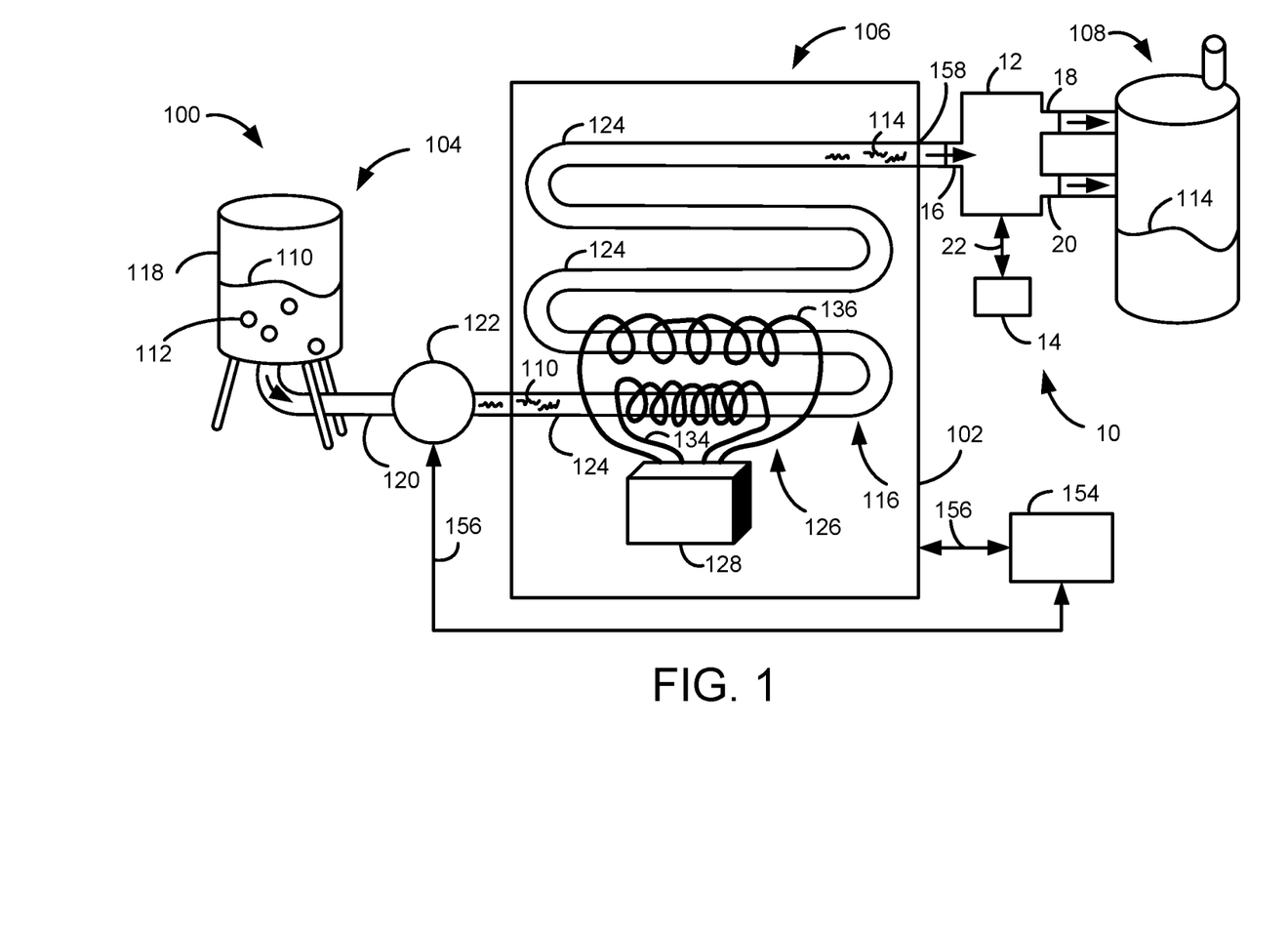
FIG. 1 illustrates a schematic diagram of an exemplary pressure regulation system having a backpressure regulator assembly in accordance with embodiments of the present disclosure.

Referring now to FIG. 1, an exemplary pressure regulation system 10 having a backpressure regulator assembly 12 and a controller 14 is shown in accordance with embodiments of the present disclosure. In the illustrated embodiment, the pressure regulation system 10 is operably connected to a decomposing system 100 having an induction heating assembly 102. In one embodiment, the controller 14 is configured to maintain an upstream pressure (or backpressure) of the decomposing system 100 using the backpressure regulator assembly 12.

In one embodiment, the decomposing system 100 includes a raw material supply zone 104, a heating treatment zone 106, and a treated object retrieving zone 108. The decomposing system 100 performs a decomposing treatment for converting an aqueous solution 110 having a plurality of particles 112 into a treated product 114 to be stored in the treated object retrieving zone 108 for subsequent retrieval.

In embodiments, the regulation and control operations of the pressure regulation system 10 using the controller 14 refer to one or more backpressure maintenance operations conducted for keeping a primary pressure of the treated product 114 at a desired level. As an example only, an initial pressure of the treated product 114 before the operation of the pressure regulation system 10 can be approximately one megapascal (1 MPa) but a final pressure of the treated product 114 after the operation of the pressure regulation system 10 can be approximately zero (0) MPa.

In one embodiment, the controller 14 commands or instructs relevant valves to appropriately actuate corresponding valves, e.g., upwardly or downwardly, such that the primary pressure of the treated product 114 can be maintained during operation. In embodiments, the valves can include one or more valves shown in FIGS. 2 and 3A-3B, such as air supply valves 38, 42, air discharge valves 40, 44, slurry supply valves 50, 58, slurry discharge valves 54, 62, and the like. Detailed operations of the pressure regulation system 10 are described in paragraphs relating to FIGS. 2 and 3A-3B.

Exemplary particles 112 include a biological material and/or an organic material. In one example, the biological material can include an agricultural waste, such as cotton, straw, corn, peanut byproducts and the like, and the organic material can include resin, plastic, polymer, polyester, and the like. Other suitable materials, such as inorganic substances, can also be included as the particles 112 to suit the application.

Other exemplary particles 112 can include different fiber materials. In one example, the fiber materials include plastic-based fibers, cellulose-based fibers, and/or protein-based fibers. For example, the plastic-based fibers include polyester, nylon, acrylic, and elastane fibers, the cellulose-base fibers include cotton, viscose, lyocell, and bast fibers (e.g., linen, hemp, or jute materials), and the protein-based fibers include wool and silk fibers.

The respective zones 104, 106, 108 can be arranged in the order shown in FIG. 1, and respectively treat the successively flowing and passing aqueous solution 110 to be treated by the induction heating assembly 102. For example, the aqueous solution 110 can be fed through a hollow portion of a pipe body 116 of the induction heating assembly 102.

In FIG. 1, the raw material supply zone 104 includes a tank 118 for storing a proper amount of the aqueous solution 110 to be treated by the induction heating assembly 102. A feed path 120 formed of a metal pipe (e.g., stainless) is connected at one end to the tank 118 and at the other end to the induction heating assembly 102.

A typical example of the tank 118 has a tank capacity of 1000 liters (L), a discharge pressure of 0.1 megapascal (MPa), and a flow rate of 10-40 liter per minute (L/min). However, the tank capacity, the discharge pressure, and the flow rate can vary to suit different applications. A pump 122, for example, can be connected to the feed path 120 for generating a high pressure that increases the discharge pressure of the aqueous solution 110 and for forcibly securing the flow rate of the aqueous solution 110 in the feed path 120.

As shown in FIG. 1, the heating treatment zone 106 includes the induction heating assembly 102 having the pipe body 116. To induce the chemical reaction in the aqueous solution 110, the induction heating assembly 102 inductively heats the aqueous solution 110 to a predetermined treatment temperature while the aqueous solution 110 is fed in the pipe body 116. Specifically, the pipe body 116 of the heating treatment zone 106 includes one or more metal pipes 124 functioning as a feed heating kiln body. An exemplary treatment temperature ranges approximately between 100-350 degrees Celsius (° C.).

Further, the induction heating assembly 102 includes one or more heating induction coils 126 configured to surround at least a portion of the metal pipes 124, and a high-frequency power supply unit 128 configured to inductively drive the heating induction coils 126. In one embodiment, the heating induction coils 126 includes a first heating induction coil 134 surrounding a first portion of the metal pipe 124 and a second heating induction coil 136 surrounding a second portion of the metal pipe 124.

In order to use a hollow portion of the metal pipe 124 as a flow path for the aqueous solution 110, the metal pipe 124 has one end communicating with and connected to a discharge end of the feed path 120 of the raw material supply zone 104, and is made of stainless steel to be inductively heated by the heating induction coils 126.

A typical inner diameter of each metal pipe 124 is approximately 50 millimeters (mm) or 2 inches and a typical length of each metal pipe 124 is approximately 10 meters. In embodiments, the inner diameter of each metal pipe 124 can range between 2 and 4 inches, and the length of each metal type 124 can range between 10 and 80 meters depending on the type of substance of the particles 112 in the aqueous solution 110. For example, for cotton particles, the length can be about 10 meters, but for plastic particles, the length can be about 50 meters. However, the inner diameter and the length can vary to suit different applications.

In one embodiment, the metal pipe 124 may be disposed with an upward inclination to facilitate a feed of the aqueous solution 110 to be treated. However, in another embodiment, the feed path 120 may be disposed with a downward inclination to facilitate the feed of the aqueous solution 110. Other suitable arrangements are also contemplated to suit the application.

The high-frequency power supply unit 128 generates and passes a high-frequency current enough to increase the temperature of the metal pipe 124 to a predetermined treatment temperature, e.g., 100-350° C., for the aqueous solution 110 to be treated using the heating induction coils 126. An exemplary energization frequency of the high-frequency power supply unit 128 can be approximately 20 kilohertz (KHz) and a maximum output can be approximately 270 kilowatts (KW). However, the frequency and the maximum output of the high-frequency power supply unit 128 can vary to suit different applications.

Exemplary arrangements of the metal pipes 124 in the induction heating assembly 102 can be in a horizontal, vertical, or diagonal attitude to suit different applications. However, the diagonal attitude can be selected in consideration of a type of particles 112 and/or the feed of the aqueous solution 110.

In the illustrated embodiment, a control system 154 is communicably connected to the induction heating assembly 102 via a communication link 156. In one embodiment, the control system 154 includes computer readable program instructions stored in one of memories of electronic controllers in the control system 154 and executed by a respective processor of the electronic controllers, or other computer usable medium. In another embodiment, the control system 154 includes a module or controller, which may or may not be independent from one of the electronic controllers of the decomposing system 100.

In FIG. 1, the backpressure regulator assembly 12 of the pressure regulation system 10 has an inlet 16, a first outlet 18, and a second outlet 20. Although a single inlet 16 and double outlets 18, 20 are shown, any number of inlets and outlets is contemplated to suit different applications. In the illustrated embodiment, the inlet 16 of the backpressure regulator assembly 12 is communicating with and fluidically connected to a discharge end 158 of the metal pipes 124 in the induction heating assembly 102. At the discharge end 158, the treated product 114 is discharged at a high pressure (e.g., generated by the pump 122).

As a continuous flow path for the treated product 114, the first outlet 18 and the second outlet 20 of the backpressure regulator assembly 12 are communicating with and fluidically connected to the treated object retrieving zone 108. In this configuration, the pressurized treated product 114 received from the discharge end 158 of the metal pipes 124 in the induction heating assembly 102 passes through the backpressure regulator assembly 12 at a constant flow rate. As such, the treated product 114 is continuously delivered to and stored in the treated object retrieving zone 108 without interruption.

Various automated operations of the backpressure regulator assembly 12 are achieved by the controller 14. In the illustrated embodiment, the controller 14 is communicably connected to the backpressure regulator assembly 12 via a communication link 22. In embodiments, the communication link 22 can include a wired and/or wireless data transmission interface. Detailed components of the backpressure regulator assembly 12 are described in paragraphs relating to FIGS. 2 and 3A-3B.

Figure 2:
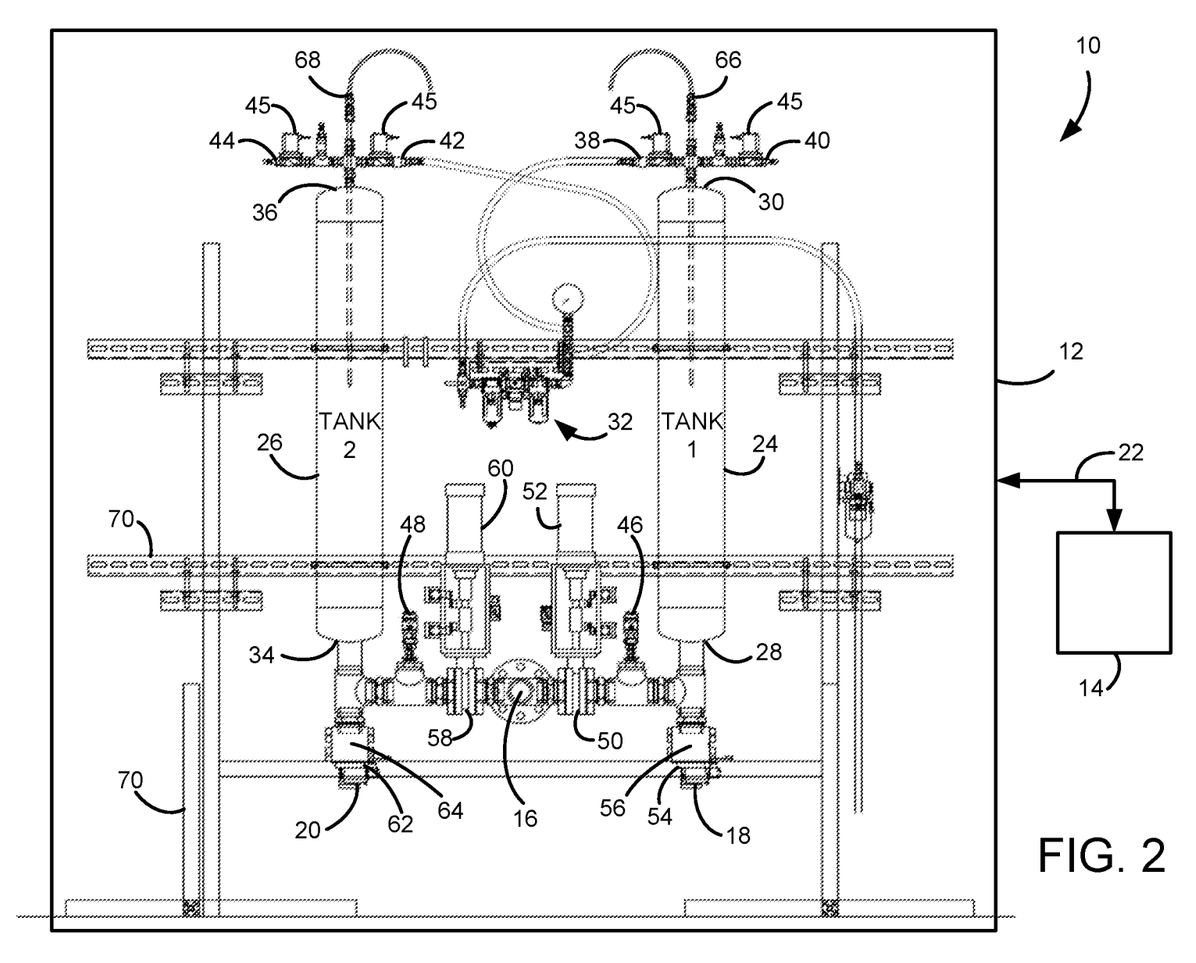
FIG. 2 illustrates a schematic diagram of an exemplary configuration of the backpressure regulator assembly of FIG. 1.

Referring now to FIG. 2, an exemplary configuration of the backpressure regulator assembly 12 is shown. In one embodiment, the backpressure regulator assembly 12 includes a first reservoir (TANK1) 24 and a second reservoir (TANK2) 26, both of which are configured to store the treated product 114. Although two reservoirs 24 and 26 are shown for illustrative purposes, any number of reservoirs is contemplated to suit different applications. The inlet 16 of the backpressure regulator assembly 12 is fluidically connected to both the first reservoir 24 and the second reservoir 26. Also, the first outlet 18 is fluidically connected to TANK1 24, and the second outlet 20 is fluidically connected to TANK2 26.

In one embodiment, a first end 28 of TANK1 24 is fluidically connected to the inlet 16 of the backpressure regulator assembly 12 and an opposite second end 30 of TANK1 24 is fluidically connected to an air supply assembly 32. Similarly, a first end 34 of TANK2 26 is fluidically connected to the inlet 16 of the backpressure regulator assembly 12 and an opposite second end 36 of TANK2 26 is fluidically connected to the air supply assembly 32.

In this illustrated embodiment, the air supply assembly 32 is configured to provide air pressure for both TANK1 24 and TANK2 26. In another embodiment, separate air supply assemblies can be used to independently provide the air pressure for TANK1 24 and TANK2 26. To selectively control the air pressure, a first air supply valve 38 and a first air discharge valve 40 are connected to the second end 30 of TANK1 24.

Similarly, a second air supply valve 42 and a second air discharge valve 44 are connected to the second end of 36 of TANK2 26. In one embodiment, the first air supply valve 38, the first air discharge valve 40, the second air supply valve 42, and the second air discharge valve 44 are operated by respective actuators 45, such as solenoids.

During operation, however, one or more bursting incidents in TANK1 24 (or TANK2 26) can occur due to the treated product 114 discharged from the inlet 16 at the high pressure. Thus, partial or full opening and closing operations of the first air supply valve 38 and the first air discharge valve 40 are desired to maintain a certain level of air pressure in TANK1 24.

To provide a smooth flow of the treated product 114 into TANK1 24, the controller 14 can control the air pressure in TANK1 24 by selectively performing such opening and closing operations. Similarly, the controller 14 can control the opening and closing operations of the second air supply valve 42 and the second air discharge valve 44.

A first pressure sensor 46 configured to measure an inner pressure of TANK1 24 is operably connected upstream from the first end 28 of TANK1 24. Similarly, a second pressure sensor 48 configured to measure an inner pressure of TANK2 26 is operably connected upstream from the first end 34 of TANK2 26. In another embodiment, the first pressure sensor 46 can be operably connected near the second end 30 of TANK1 24 or directly to a housing of TANK1 24 to suit the application. The second pressure sensor 48 can also be arranged in the similar fashion as the first pressure sensor 46. Any number of pressure sensors disposed on any suitable locations is contemplated to suit different applications.

For facilitating an intake of the treated product 114 into TANK1 24, a first slurry supply valve 50 operated by a first supply valve actuator 52 is connected at one end to the inlet 16 and at the other end to the first end 28 of TANK1 24. In one embodiment, an intake flow rate of the treated product 114 is adjusted by the first supply valve actuator 52 using, for example, a knife or slide gate valve.

For facilitating an output of the treated product 114 from TANK1 24, a first slurry discharge valve 54 operated by a first discharge valve actuator 56 is connected to the first end 28 of TANK1 24. In one embodiment, an output flow rate of the treated product 114 is adjusted by the first discharge valve actuator 56 using, for example, a knife or slide gate valve.

Likewise, for facilitating an intake of the treated product 114 into TANK2 26, a second slurry supply valve 58 operated by a second supply valve actuator 60 is connected at one end to the inlet 16 and at the other end to the first end 34 of TANK2 26. In one embodiment, an intake flow rate of the treated product 114 is adjusted by the second supply valve actuator 58 using, for example, a knife or slide gate valve.

For facilitating an output of the treated product 114 from TANK2 26, a second slurry discharge valve 62 operated by a second discharge valve actuator 64 is connected to the first end 34 of TANK2 26. In one embodiment, an output flow rate of the treated product 114 is adjusted by the second discharge valve actuator 64 using, for example, a knife or slide gate valve.

A first liquid level sensor 66 configured to measure a level of the treated product 114 in TANK1 24 is operably connected near the second end 30 of TANK1 24. Similarly, a second liquid level sensor 68 configured to measure a level of the treated product 114 in TANK2 26 is operably connected near the second end 36 of TANK2 26. In one embodiment, the first liquid level sensor 66 measures in real time a current level of the treated product 114 stored in TANK1 24 for monitoring purposes. Similarly, the second liquid level sensor 68 measures in real time a current level of the treated product 114 stored in TANK2 26.

In FIG. 2, the controller 14 is communicably connected to the backpressure regulator assembly 12 via the communication link 22. In one embodiment, the controller 14 includes computer readable program instructions stored in one of memories of electronic controllers in the controller 14 and executed by a respective processor of the electronic controllers, or other computer usable medium.

In another embodiment, the controller 14 includes a module or controller, which may or may not be independent from one of the electronic controllers of the pressure regulation system 10. For example, the controller 14 can be a programmable logic controller (PLC) or programmable controller.

In one embodiment, the controller 14 automatically controls the opening and closing operations of the first air supply valve 38 and the first air discharge valve 40 by instructing the respective actuators 45 using the computer readable program instructions. Further, the controller 14 automatically controls the opening and closing operations of the second air supply valve 42 and the second air discharge valve 44 by instructing the respective actuators 45 using the computer readable program instructions.

In embodiments, the controller 14 automatically controls the opening and closing operations of the first slurry supply valve 50 by instructing the first supply valve actuator 52 using the computer readable program instructions. Also, the controller 14 automatically controls the opening and closing operations of the first slurry discharge valve 54 by instructing the first discharge valve actuator 56 using the computer readable program instructions.

In embodiments, the controller 14 controls the operations of the second slurry supply valve 58 and the second slurry discharge valve 62 by instructing the respective second supply valve actuator 60 and second discharge valve actuator 64. Further, in certain embodiments, other relevant components, such as the air supply assembly 32 can be controlled by the controller 14. Also included in the backpressure regulator assembly 12 are one or more support structures 70, such as chassis, configured to removably secure various components of the backpressure regulator assembly 12 as known in the art.

Figure 3A:
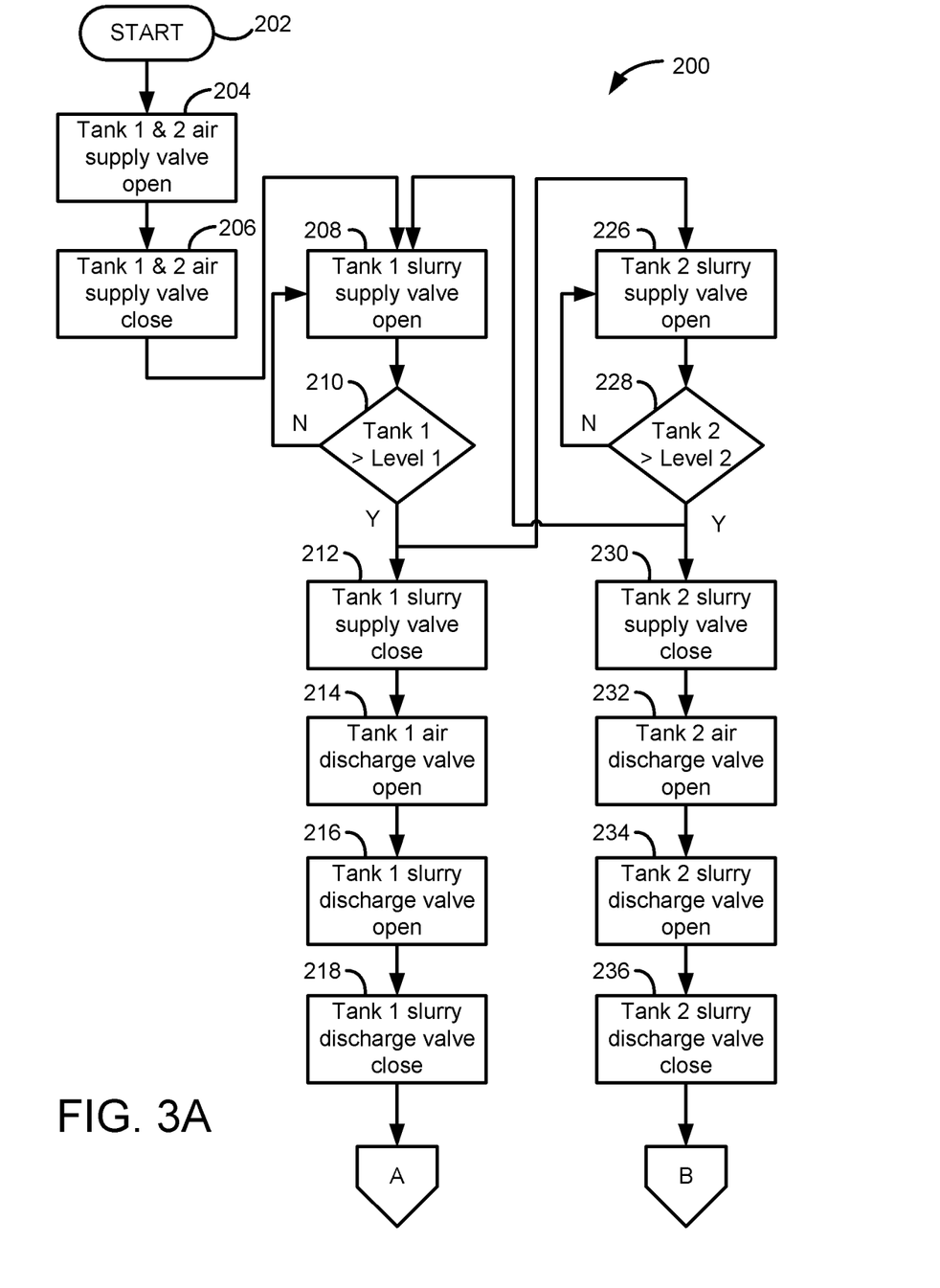
FIGS. 3A and 3B illustrate a flow chart of an exemplary method of maintaining a backpressure of a fluidic product having particles using the pressure regulation system of FIG. 1 in accordance with embodiments of the present disclosure.
Figure 3B:
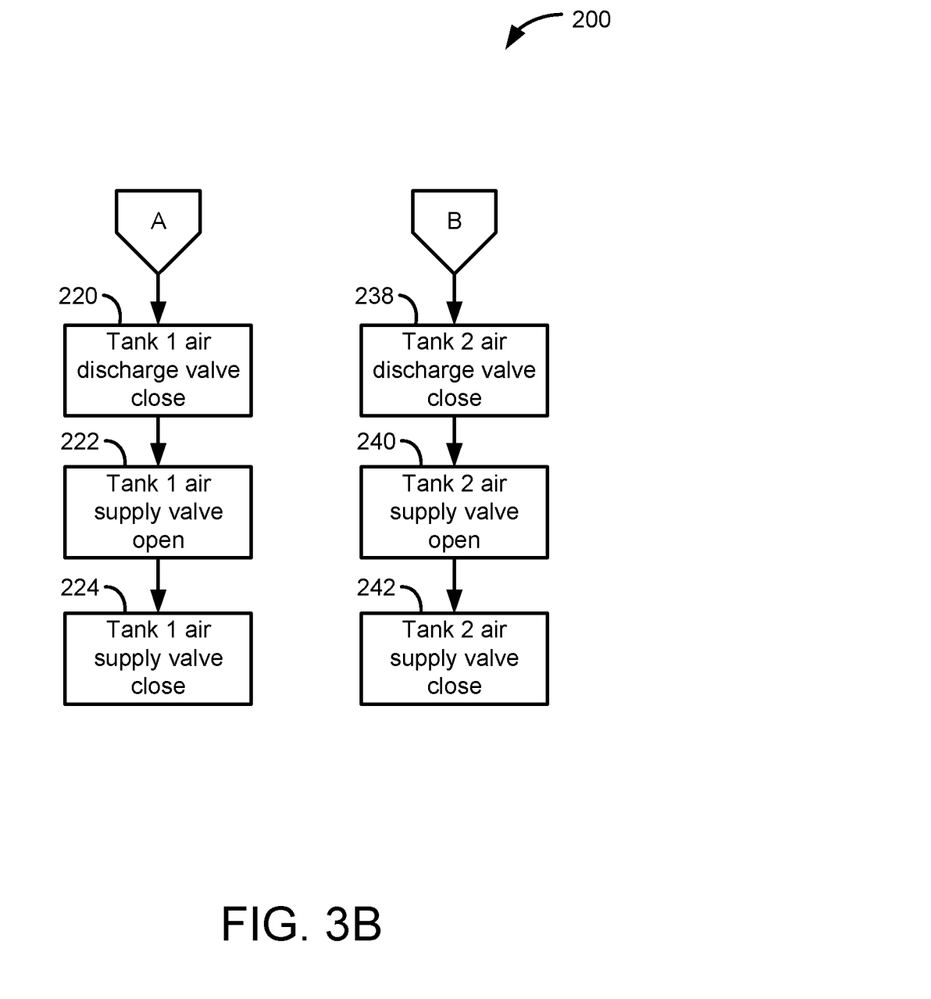

Referring now to FIGS. 3A and 3B, a flow chart of an exemplary method 200 of maintaining the backpressure of a fluidic product is shown. In the illustrated embodiment, the fluidic product is the aqueous solution 110, having a plurality of particles, such as the particles 112. The method 200 is shown in relation to FIGS. 1 and 2, including the pressure regulation system 10.

In embodiments, the method 200 can be implemented by the controller 14 (FIG. 2) communicably connected to the backpressure regulator assembly 12. In one embodiment, the steps implementing the method 200 may be in the form of computer readable program instructions stored in one of memories of electronic controllers in the controller 14 and executed by a respective processor of the electronic controllers, or other computer usable medium.

In another embodiment, the steps implementing the method 200 may be stored and executed on a module or a control system, which may or may not be independent from one of the electronic controllers of the pressure regulation system 10. The method 200 may run continuously or may be initiated in response to one or more predetermined events, such as an initial push of a start button (not shown). Any steps of the method 200 can be executed in any order suitable for the application.

The method 200 begins in step 202. In step 204, the controller 14 instructs the respective actuators 45 to transition TANK1 24 and TANK2 26 into a pressurized state. In embodiments, the controller 14 instructs the respective actuators 45 to open the first air supply valve 38 and the second air supply valve 42 for receiving compressed air into TANK1 24 and TANK2 26. Thus, TANK1 24 and TANK2 26 are pressurized to a predetermined pressure level, e.g., one megapascal (1 MPa), to approximately match a pressure level of the inlet 16. In embodiments, the pressure levels are measured using the respective first and second pressure sensors 46 and 48.

In some embodiments, the predetermined pressure level can be 0.93 MPa depending on a power capability of the air supply assembly 32. As such, the controller 14 instructs the air supply assembly 32 to deliver sufficient compressed air into TANK1 24 and TANK2 26 to pressurize and reach the predetermined pressure level.

In step 206, the controller 14 instructs the respective actuators 45 to close the first air supply valve 38 and/or the second air supply valve 42 for TANK1 24 and TANK2 26 when the predetermined pressure level is obtained in the respective reservoirs, i.e., TANK1 24 and TANK2 26. At this moment, TANK1 24 and TANK2 26 are ready to receive the treated product 114 from the inlet 16 of the backpressure regulator assembly 12.

In step 208, the controller 14 instructs the first supply valve actuator 52 to open the first slurry supply valve 50 for receiving the treated product 114 from the inlet 16. As such, the treated product 114 is continuously delivered to TANK1 24 until the level of the treated product 114 in TANK1 24 reaches a predetermined level (e.g., eighty percent (80%) full).

In step 210, the controller 14 determines whether a current level of the treated product 114 delivered into TANK1 24 is greater than a predetermined level LEVEL1 using the first liquid level sensor 66. When the current level of the treated product 114 in TANK1 24 is greater than the predetermined level LEVEL1, control proceeds to step 212 and step 226.

It is advantageous that although the intake of the treated product 114 into TANK1 24 is discontinued in step 212, the intake of the treated product 114 into TANK2 26 continues in step 226. As such, the discharge flow of the treated product 114 is continuous and uninterrupted. When the current level of the treated product 114 in TANK1 24 is less than or equal to the predetermined level LEVEL1, control returns to step 208.

In step 212, the controller 14 instructs the first supply valve actuator 52 to close the first slurry supply valve 50 for discontinuing the feed of the treated product 114 from the inlet 16.

In step 214, the controller 14 instructs the respective actuator 45 to transition TANK1 24 into an unpressurized state. In embodiments, the controller 14 instructs the respective actuator 45 to open the first air discharge valve 40 for equalizing TANK1 24 with atmospheric pressure. In some embodiments, the inner pressure of TANK1 24 is approximately 0.00 MPa. At this moment, TANK1 24 is transitioned into the unpressurized state and ready to discharge the treated product 114 from the first outlet 18 of the backpressure regulator assembly 12.

In step 216, the controller 14 instructs the first discharge valve actuator 56 to open the first slurry discharge valve 54 for facilitating the discharge of the treated product 114 from TANK1 24 through the first outlet 18. In this configuration, the discharge of the treated product 114 from TANK1 24 is achieved under the action of gravity since the inner pressure of TANK1 24 is equalized with the atmosphere pressure.

In step 218, the controller 14 instructs the first discharge valve actuator 56 to close the first slurry discharge valve 54 for discontinuing the discharge of the treated product 114 from the first outlet 18. In one embodiment, the first slurry discharge valve 54 is closed when TANK1 24 is empty.

In step 220, the controller 14 instructs the respective actuator 45 to transition TANK1 into the pressurized state. In embodiments, the controller 14 instructs the respective actuator 45 to close the first air discharge valve 40 to transition TANK1 24 into the pressurized state.

In step 222, the controller 14 instructs the respective actuator 45 to open the first air supply valve 38 for receiving compressed air into TANK1 24. As a result, TANK1 24 is pressurized to the predetermined pressure level (e.g., 1 MPa) to approximately match the pressure level of the inlet 16.

In step 224, the controller 14 instructs the respective actuator 45 to close the first air supply valve 38 for TANK1 24 when the predetermined pressure level is obtained in TANK1 24. At this moment, TANK1 24 is transitioned into the pressurized state and ready to receive the treated product 114 from the inlet 16 of the backpressure regulator assembly 12.

In step 226, the controller 14 instructs the second supply valve actuator 60 to open the second slurry supply valve 58 for receiving the treated product 114 from the inlet 16. As such, the treated product 114 is continuously delivered to TANK2 26 until the level of the treated product 114 in TANK2 26 reaches a predetermined level (e.g., eighty percent (80%) full).

In step 228, the controller 14 determines whether a current level of the treated product 114 delivered into TANK2 26 is greater than a predetermined level LEVEL2 using the second liquid level sensor 68. When the current level of the treated product 114 in TANK2 26 is greater than the predetermined level LEVEL2, control proceeds to step 230 and step 208.

It is advantageous that although the intake of the treated product 114 into TANK2 26 is discontinued in step 230, the intake of the treated product 114 into TANK1 24 continues in step 208. As such, the discharge flow of the treated product 114 is continuous and uninterrupted. When the current level of the treated product 114 in TANK2 26 is less than or equal to the predetermined level LEVEL2, control returns to step 226.

In step 230, the controller 14 instructs the second supply valve actuator 60 to close the second slurry supply valve 58 for discontinuing the feed of the treated product 114 from the inlet 16.

In step 232, the controller 14 instructs the respective actuator 45 to transition TANK2 26 into an unpressurized state. In embodiments, the controller 14 instructs the respective actuator 45 to open the second air discharge valve 44 for equalizing TANK2 26 with atmospheric pressure. In some embodiments, the inner pressure of TANK2 26 is approximately 0.00 MPa. At this moment, TANK2 26 is transitioned into the unpressurized state and ready to discharge the treated product 114 from the second outlet 20 of the backpressure regulator assembly 12.

In step 234, the controller 14 instructs the second discharge valve actuator 64 to open the second slurry discharge valve 62 for facilitating the discharge of the treated product 114 from TANK2 26 through the second outlet 20. In this configuration, the discharge of the treated product 114 from TANK2 26 is achieved under the action of gravity since the inner pressure of TANK2 26 is equalized with the atmosphere pressure.

In step 236, the controller 14 instructs the second discharge valve actuator 64 to close the second slurry discharge valve 62 for discontinuing the discharge of the treated product 114 from the second outlet 20. In one embodiment, the second slurry discharge valve 62 is closed when TANK2 26 is empty.

In step 238, the controller 14 instructs the respective actuator 45 to transition TANK2 into the pressurized state. In embodiments, the controller 14 instructs the respective actuator 45 to close the second air discharge valve 44 to transition TANK2 26 into the pressurized state.

In step 240, the controller 14 instructs the respective actuator 45 to open the second air supply valve 42 for receiving compressed air into TANK2 26. As a result, TANK2 26 is pressurized to the predetermined pressure level (e.g., 1 MPa) to approximately match the pressure level of the inlet 16.

In step 242, the controller 14 instructs the respective actuator 45 to close the second air supply valve 42 for TANK2 26 when the predetermined pressure level is obtained in TANK2 26. At this moment, TANK2 26 is transitioned into the pressurized state and ready to receive the treated product 114 from the inlet 16 of the backpressure regulator assembly 12.

The method 200 may end in step 242 and/or control may return to step 202. One or more of steps 204-242 can be repeated as desired to suit the application.

It should be appreciated that any steps of the method 200 described herein may be implemented by a process controller, or other similar component, of the controller 14. Specifically, the process controller may be configured to execute computer readable instructions for performing one or more steps of the method 200. In one embodiment, the process controller may also be configured to transition from an operating state, during which a larger number of operations are performed, to a sleep state, in which a limited number of operations are performed, thus further reducing quiescent power draw of an electrical power source for the pressure regulation system 10.

The present disclosure is more easily comprehended by reference to the specific embodiments, examples and drawings recited hereinabove which are representative of the present disclosure. It must be understood, however, that the same are provided for the purpose of illustration, and that the present disclosure may be practiced otherwise than as specifically illustrated without departing from its spirit and scope. As will be realized, the present disclosure is capable of various other embodiments and that its several components and related details are capable of various alterations, all without departing from the basic concept of the present disclosure. Accordingly, descriptions will be regarded as illustrative in nature and not as restrictive in any form whatsoever. Modifications and variations of the system, method, and apparatus described herein will be obvious to those skilled in the art. Such modifications and variations are intended to come within the scope of the appended claims.

What is claimed is:

1. A method of maintaining a backpressure of a fluidic product, the method comprising:
   pressurizing a first reservoir to a first predetermined pressure level using compressed air;
   delivering the fluidic product to the pressurized first reservoir until a current level of the fluidic product in the first reservoir reaches a first predetermined level;
   pressurizing a second reservoir to a second predetermined pressure level using the compressed air;
   delivering the fluidic product to the pressurized second reservoir until a current level of the fluidic product in the second reservoir reaches a second predetermined level;
   controlling the backpressure of the fluidic product using the first reservoir and the second reservoir such that a discharge flow of the fluidic product is continuous;
   delivering the fluidic product to the second reservoir when an intake of the fluidic product into the first reservoir is discontinued;
   transitioning the first reservoir into an unpressurized state after discontinuing the intake of the fluidic product into the first reservoir; and
   equalizing the first reservoir with atmospheric pressure to achieve the unpressurized state in the first reservoir.

2. The method of claim 1, further comprising discharging the fluidic product from the first reservoir after transitioning the first reservoir into the unpressurized state.

3. The method of claim 2, further comprising discontinuing the discharging of the fluidic product from the first reservoir when the first reservoir is empty.

4. The method of claim 3, further comprising transitioning the first reservoir into a pressurized state after discontinuing the discharging of the fluidic product from the first reservoir.

5. The method of claim 1, further comprising delivering the fluidic product to the first reservoir when an intake of the fluidic product into the second reservoir is discontinued.

6. The method of claim 5, further comprising transitioning the second reservoir into an unpressurized state after discontinuing the intake of the fluidic product into the second reservoir.

7. The method of claim 6, further comprising equalizing the second reservoir with atmospheric pressure to achieve the unpressurized state in the second reservoir.

8. The method of claim 6, further comprising discharging the fluidic product from the second reservoir after transitioning the second reservoir into the unpressurized state.

9. The method of claim 8, further comprising discontinuing the discharging of the fluidic product from the second reservoir when the second reservoir is empty.

10. The method of claim 9, further comprising transitioning the second reservoir into a pressurized state after discontinuing the discharging of the fluidic product from the second reservoir.

11. A method of maintaining a backpressure of a fluidic product, the method comprising:

pressurizing a first reservoir to a first predetermined pressure level using compressed air;
delivering the fluidic product to the pressurized first reservoir until a current level of the fluidic product in the first reservoir reaches a first predetermined level;
pressurizing a second reservoir to a second predetermined pressure level using the compressed air;
delivering the fluidic product to the pressurized second reservoir until a current level of the fluidic product in the second reservoir reaches a second predetermined level;
controlling the backpressure of the fluidic product using the first reservoir and the second reservoir such that a discharge flow of the fluidic product is continuous;
continuously delivering the fluidic product to the first reservoir when an intake of the fluidic product into the second reservoir is discontinued;
transitioning the second reservoir into an unpressurized state after discontinuing the intake of the fluidic product into the second reservoir; and
equalizing the second reservoir with atmospheric pressure to achieve the unpressurized state in the second reservoir.

12. The method of claim 11, further comprising discharging the fluidic product from the second reservoir after transitioning the second reservoir into the unpressurized state.

13. The method of claim 12, further comprising discontinuing the discharging of the fluidic product from the second reservoir when the second reservoir is empty.

14. The method of claim 13, further comprising transitioning the second reservoir into a pressurized state after discontinuing the discharging of the fluidic product from the second reservoir.

15. The method of claim 11, further comprising delivering the fluidic product to the second reservoir when an intake of the fluidic product into the first reservoir is discontinued.

16. The method of claim 15, further comprising transitioning the first reservoir into an unpressurized state after discontinuing the intake of the fluidic product into the first reservoir.

17. The method of claim 16, further comprising equalizing the first reservoir with atmospheric pressure to achieve the unpressurized state in the first reservoir.

* * * * *